US006682077B1

(12) United States Patent
Letourneau

(10) Patent No.: US 6,682,077 B1
(45) Date of Patent: Jan. 27, 2004

(54) LABYRINTH SEAL FOR DISC TURBINE

(76) Inventor: Guy Louis Letourneau, 33470 Chinook Plz., Scappoose, OR (US) 97056

( * ) Notice: Subject to any disclaimer, the term of this patent is extended or adjusted under 35 U.S.C. 154(b) by 65 days.

(21) Appl. No.: 10/075,467

(22) Filed: Feb. 13, 2002

Related U.S. Application Data
(60) Provisional application No. 60/268,605, filed on Feb. 14, 2001.

(51) Int. Cl.[7] .............................................. F16J 15/447
(52) U.S. Cl. ...................... 277/412; 277/409; 277/411; 277/418; 277/420; 277/421
(58) Field of Search ................................ 277/409, 411, 277/412, 418, 419, 420, 421, 321

(56) References Cited
U.S. PATENT DOCUMENTS 3,085,809 A * 4/1963 Cooper .......................... 277/415
3,610,387 A * 10/1971 Vom Stein .................... 193/37
3,755,870 A * 9/1973 Young et al. ............. 29/898.11
4,199,154 A * 4/1980 Mueller ........................ 277/420
4,277,114 A * 7/1981 Lindegger .................... 384/144
4,304,310 A * 12/1981 Garrett ........................ 175/195
4,895,460 A * 1/1990 Grzina ......................... 384/132
4,955,462 A * 9/1990 Bilodeau et al. ............... 193/37
5,676,472 A * 10/1997 Solomon et al. ............. 384/607

* cited by examiner

Primary Examiner—Anthony Knight
Assistant Examiner—E Peavey

(57) ABSTRACT

A disc turbine has a rotor assembly of spaced apart discs with at least one disc equipped with an annular labyrinth seal whose grooves interdigitate with a corresponding labyrinth seal mounted in the sidewall of the rotor housing. A pattern of aligned through holes in the rotor housing and the rotor housing seal assist in the axial and concentric alignment of the rotary assembly with respect to the stationary assembly, and the inspection of same, and provide access through at least one sensing port to working fluid proximal to the seal entrance.

13 Claims, 3 Drawing Sheets

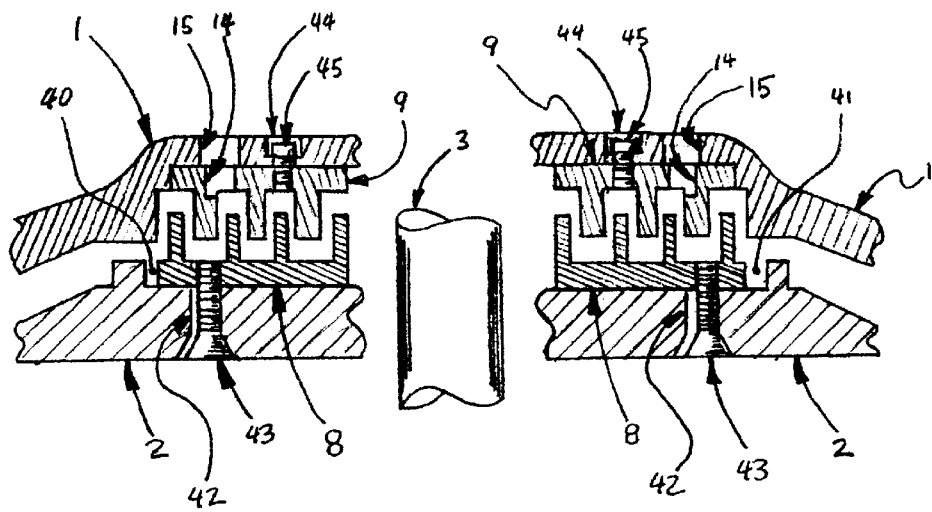
Fig. 4
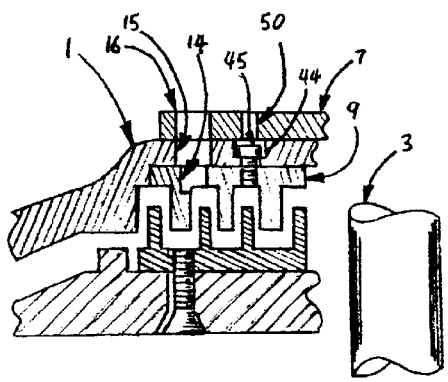
Fig. 5
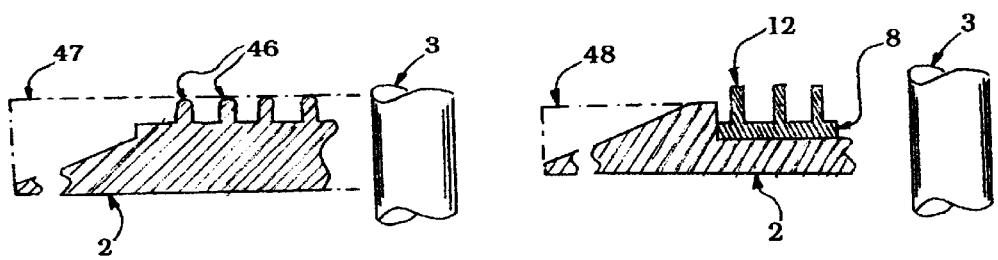
PRIOR ART
Fig. 6A
Fig. 6B

LABYRINTH SEAL FOR DISC TURBINE

CROSS-REFERENCE TO RELATED APPLICATIONS

This application claims the benefit of U.S. Provisional Patent Application 60/268,605, filed Feb. 14, 2001.

BACKGROUND OF THE INVENTION

1. Field of the Invention

This invention relates to a disc turbine rotor assembly equipped with at least one labyrinth seal whose concentric sealing rings interdigitate with a corresponding features of a labyrinth seal mounted in the sidewall of the rotor housing, and affordances which assist in assembly alignment and inspection, positional verification, and which provide access to working fluid in the immediate vicinity of the labyrinth seal for sensing or sampling.

2. Description of the Related Art

Turbines comprised of spaced-apart rotor discs were first described by Nikola Tesla in U.S. Pat. No. 1,061,142 and 1,061,206. For this reason, these turbines are sometimes referred to as Tesla turbines, but are alternatively known as Prandtl layer turbines, boundary layer turbines, cohesion-type turbines, and bladeless turbines.

The turbine rotor consists of a stack of discs spaced apart and fixed to a rotatable shaft. The rotor assembly is contained in a housing closely fitted to the perimeter of the discs. The discs have vents near the center, and the housing includes at least one outlet near the center. In operation, an energetic fluid at pressure and temperature is introduced at the periphery of the disc stack and contained in a housing which closely follows the perimeter of the discs. The fluid passes between the discs and exits the stack assembly through vents near the center, leaving the housing through its outlets.

The tangential flow component of the working fluid creates centripetal force within the working fluid, which must be overcome by additional fluid entering the housing. Therefore, in the steady state, a significant drop in pressure exists between the inlet and the outlet of the machine.

For a turbine that introduces working fluid at the periphery of the rotor assembly and exhausts said fluid axially through outlets near the center, any portion of the working fluid allowed to circumvent the rim of an end disc will traverse the outward facing surface of the end disc and escape through the outlet, and will impart significantly less momentum to the turbine rotor than the fluid which enters between a pair of discs and departs though the disc vents.

It is therefore understood that flow of working fluid across the outward facing surface of an end disc represents a loss of mechanical efficiency, and that methods and devices which impede fluid flow along this route are desirable and useful, and represent advances in the state of the art.

Several prior art solutions, including Burgess (U.S. Pat. No. 6,000,701) for example, employ rubbing or wiping components which physically close the gap between the stationary turbine housing and the rotating surfaces of the end disc or of the shaft. However, physical contact increases rotational friction, impedes starting, and introduces maintenance and wear issues and their concomitant costs of operation.

Other solutions, such as Ackermann (U.S. Pat. No. 4,218,066) require that a set of abrasive surfaces on one part are assembled so that they tear close-fitting running grooves into comparatively cancellous or friable material. This method unfortunately generates foreign matter such as material chips or swarf, which must be removed or contained by some additional sealing stratagem. A relative alignment shift of the complimentary sides of the seal releases more foreign matter; should this occur while the turbine is running, said foreign matter may diffuse into the working fluid and be carried off and deposited at unwanted locations.

Tesla in U.S. Pat. No. 1,329,559 discloses a device which impedes fluid flow by means of a series of labyrinthine passages which turn the fluid flow back on itself. In this device, violent eddies are produced which substantially impede fluid flow in an unwanted direction.

A disadvantage inherent in the prior art is that following final assembly of a turbine rotor in its housing it becomes difficult to assess whether the rotational components contained in the inner chamber of the housing are properly centered. One prior art method of eliminating concentricity errors consists of turning the end rotor and rotor seal glands out of a single mass of material. The disadvantages of this method include increased machining time required to make such a part, and a significant increase in material waste driven by the larger volume of material which must first be secured and then removed. Both of these factors detrimentally increase the cost of such a part.

SUMMARY OF THE INVENTION

Experimentation has shown, and commonly published tables of discharge coefficients show, that abrupt squared-off passages, sharp edges, and abrupt changes of flow cross sections also sharply reduce fluid flow. For the purposes of this specification, the term "re-entrant corner" shall be used to define an edge interface between two surfaces that meet at a dihedral angle. The inventive labyrinth seal impedes fluid flow across the outside face of an end disc by forcing the fluid through a sequence of sharp-edged features and squared-off or re-entrant corners which effect abrupt changes in fluid direction and sectional flow areas, as well as abrupt and turbulent changes in momentum, velocity and pressure in the fluid attempting to pass through the seal. The second law of thermodynamics reveals that such changes of fluid state waste internal energy. Such dissipation of internal energy is a source of resistance to fluid flow.

The inventive labyrinth seal complicates the flow pattern by varying the dimensions of adjacent portions of the passage defined between the seal elements such that passage portions having a small sectional flow area are followed by passages with a greater sectional flow area. Empirical formulae commonly applied in the science of fluid friction to find fluid energy loss parameters such as the Darcy friction factor, relate frictional loss to the square of the flow sectional area. Under this relation, in choosing between an area reduction of 5% and of 10% for example, marginal analysis shows that the first 5% of area reduction will effect a 9.75% loss effect, while the second 5% will effect an additional loss effect of only 9.25%, with continually diminishing effect for further degrees of flow sectional area reduction. Thus, a sequence of sectional flow area differences can be arranged to produce any desired energy loss or impedance.

A labyrinth seal in accordance with the present invention has features on a rotating component that must be correctly aligned with complimentary features on a stationary component in order to operate properly. The inventive labyrinth seal includes inspection ports through the housing to ascertain the proper assembly position and optimal adjustment during the final stages of assembly. The labyrinth seal also provides both adjustable and centralizing features that coaxially align all salient features of the rotating components to a first axis, and align all salient features of the stationary housing components to a second axis.

Run-out and other errors of concentricity are inherent in any object containing features desired to be concentric. Means of adjustment permit an assembly strategy capable of counteracting the accumulation of radial dimensional and radial positional errors in manufacture. It is also advantageous to afford adjustment to assembly concentricity and axial position with the least degree of required disassembly. This is accomplished by means of a plurality of inspection ports through which gages can be inserted to align the seal members to the housing during assembly. A plurality of countersunk fastener openings in the housing receive complementary fasteners which can be tightened while the seal member is aligned by the gages. The fastener openings are enlarged relative to the fastener shank to permit movement of the seal member relative to its mounting surface.

Working fluid is accessible from a point substantially upstream from the final exit of the fluid past the innermost gland and into the exhaust through one or more of the inspection ports. The working fluid so sampled represents an intermediate condition between the thermodynamic states of the fluid at inlet and exhaust. The thermodynamic state of such sampled matter will vary in similarity with the state of inaccessible working fluid within the turbine itself. Measurements of its state and variations thereof can provide a useful means of investigating and controlling the operation of the mechanical system of which the turbine is a part. As an example, an automatic control system may include variations of pressure and temperature measured at this access point as disturbance inputs in an algorithm used to control a combustion process upstream of the turbine, in order to secure a system providing controllable power output and predictable fuel consumption.

An object of the present invention is to provide a new and improved labyrinth seal for a disc turbine that improves turbine efficiency by impeding in a manner free of rotational friction, the flow of working fluid seeking to escape across an outward-facing surface of an end disc.

Another object of the present invention is to provide a new and improved labyrinth seal for a disc turbine that permits inspection of the installed position of the components of the labyrinth seal from outside the disc turbine housing.

A further object of the present invention is to provide a new and improved labyrinth seal for a disc turbine that compensates for cumulative dimensional variations, or tolerance stack up to maintain the concentricity of the assembled components of the labyrinth seal.

A yet further object of the invention is to provide a new and improved labyrinth seal having means for adjusting at least some components during a final assembly stage, so that radial dimensional and radial positional errors in manufacture and assembly can be minimized.

Finally, an object of this invention is to provide access to working fluid in the immediate vicinity of the labyrinth seal for sensing or sampling.

BRIEF DESCRIPTION OF THE DRAWINGS

FIG. 4: Cross section of labyrinth seal components;

FIG. 5: Cross section of seal assembly with captured hardware; and

FIGS. 6A and 6B: Prior art and improved rotor seal glands and components.

DETAILED DESCRIPTION OF THE PREFERRED EMBODIMENT

Figure 1:
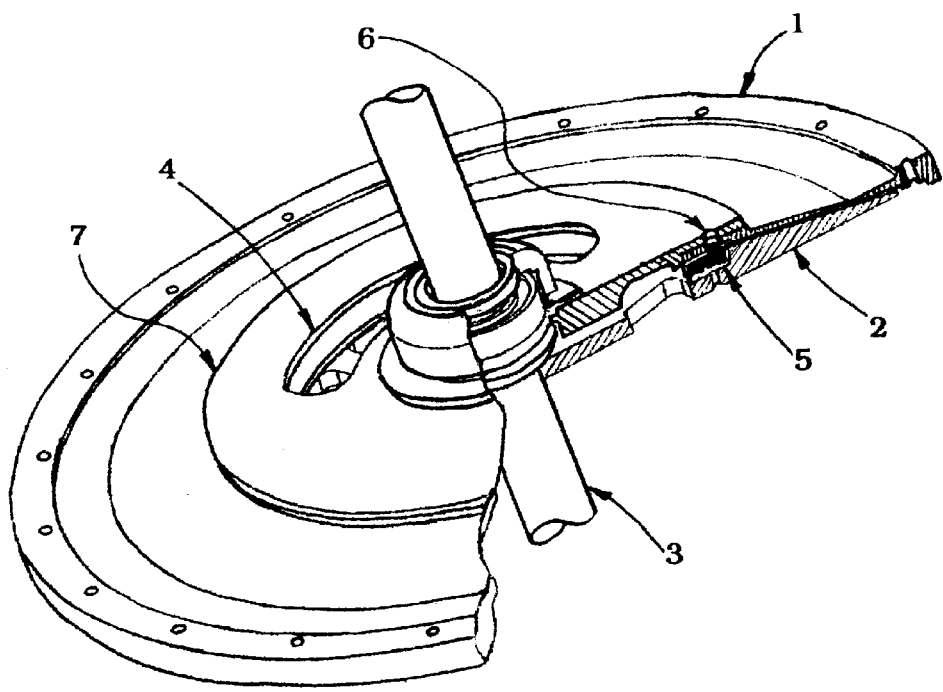
FIG. 1: Assembly including a rotor housing, end disc, and labyrinth seals.

According to the present invention as shown in FIG. 1, a disc turbine includes, among other components, an end wall [1] of the stationary rotor housing, and an end disc [2] being the first or last of a stacked series of discs which rotate within the turbine housing, affixed to a shaft [3] rotatably coupled to the stationary assembly by means of at least one bearing.

Working fluid leaves the turbine through an exhaust port [4]. In the preferred embodiment the housing end wall accepts a cover plate [7] which includes an exhaust port [4]. However, in a second embodiment the features in the cover plate are included in a single end wall component [1] which includes an exhaust port [4].

Fluid passing between the end wall [1] and the outer facing surface of the end disc [2] must pass through a labyrinth seal [5], which impedes said flow. Details of the components and features of the labyrinth seal are enlarged and illustrated in FIG. 2.

Figure 2:
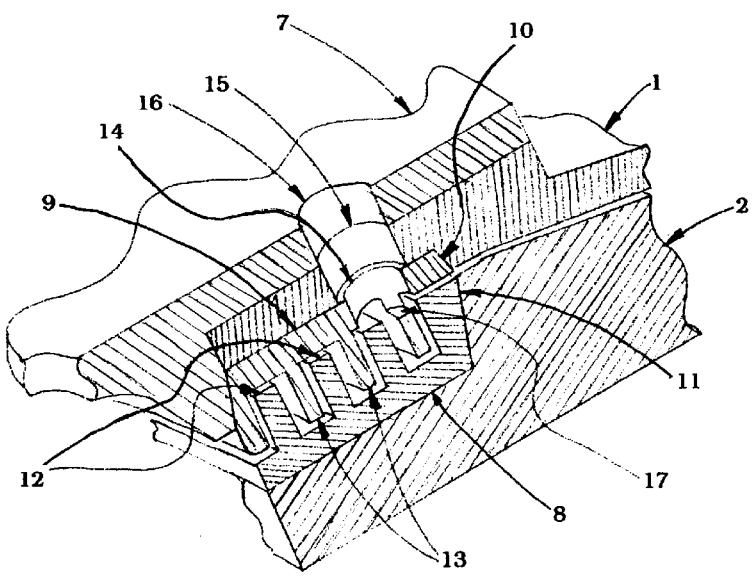
FIG. 2: Detailed view of labyrinth seal components visible in FIG. 1.

Referring to FIG. 2, the end wall [1] and rotor disc [2] include opposed facing circular recesses, which respectively accept annular labyrinth seal members [9] and [8] respectively. These recesses include centralizing receiving features [10] and [11] respectively. In the preferred embodiment, the receiving feature [10] of the housing is a taper feature which accepts and coaxially aligns the annular housing seal member [9] to its designated recess in the housing. In the preferred embodiment, the receiving feature [11] of the end disc is a taper feature which accepts and coaxially aligns the annular rotor seal member [8] to its designated recess in the housing.

Concentrating on the labyrinth seal members [8] and [9] of FIG. 2, the housing seal member [9] axially extends a first plurality of cylindrical glands [13] in a direction facing the rotor seal member [8]. The rotor seal member [8] axially extends a second plurality of cylindrical glands [12] in the opposite direction, that is, towards the housing seal member.

Close proximity of the seal members effect that the first and second pluralities of cylindrical glands mutually interdigitate, forming a radially convoluted, serpentine, annular gap comprising alternating axial and radial directions.

Continuing to examine FIG. 2, it is evident that fluid passing between the end wall [1] and the outer facing surface of the end disc [2] must next pass between labyrinth seal members [8] and [9]. In doing so, the fluid is forced through an alternation of radial and axial passages punctuated by abrupt transitions. Fluid moving through this sequence of passages is subjected to substantial and reversing modes of transverse shear. Dissipative eddies and vortices also arise, especially along the root edges of re-entrant corners. The resistance to flow exhibited by fluid in such turbulent conditions serves to attenuate said flow, achieving the impedance objective of this invention.

Although reductions and expansions of flow sectional area of as little as 5% may effect a change of the fluid energy loss parameter of nearly 10%, FIG. 2 depicts the preferred embodiment in which the change is a reduction in flow sectional area by nearly 30%, reducing the value of the fluid energy loss parameter by up to 49%. The change is seen specifically in FIG. 2 by comparing the radial dimension of the gap on the left or right sides of an end disc sealing member gland [12] as nestled in between the housing seal glands [13], with the axial gap between the underside surface of a housing seal gland [13] and the floor of the annular surface of end disc seal member [12].

Figure 3B:
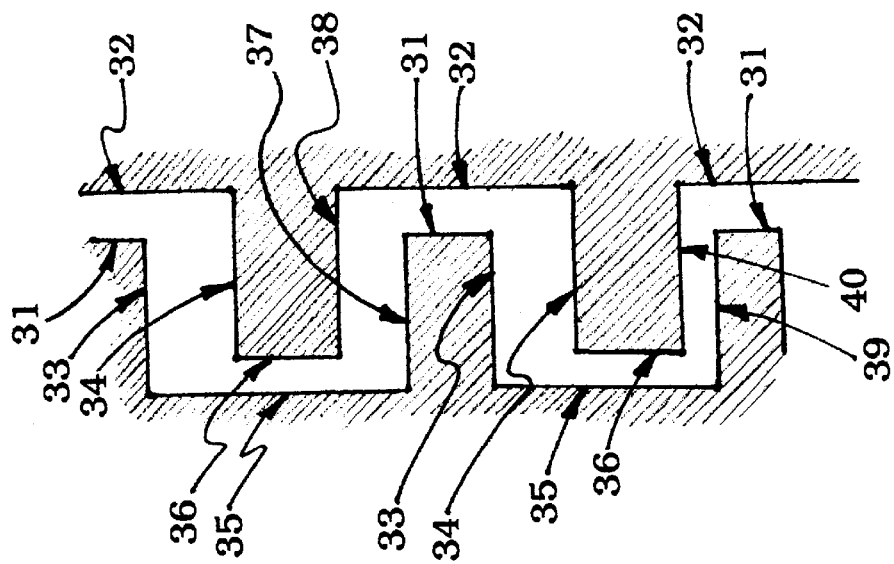
FIGS. 3A & 3B: Cross section views of labyrinth seals.
Figure 3A:
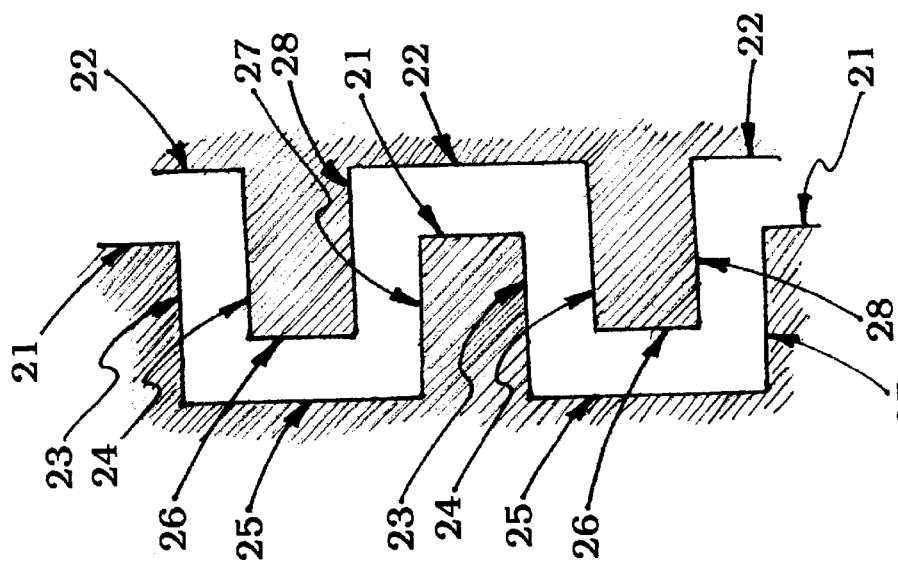

FIGS. 3A and 3B further illustrate the interdigitated structure of the labyrinth seal. FIG. 3A illustrates a prior art design by Tesla. Gland wall features [21, 23, 25, 27] reside on a housing seal member, and features [22, 24, 26, 28] reside on a rotor seal member. It is understood that the features shown are part of a larger plurality extending beyond the figure.

The Tesla design offers substantially similar gaps between pairs of opposed surfaces [21–22], [23–24], [25–26], and [27–28]. Fluid flow through this device is rendered somewhat turbulent during its excursion through the directional changes of the gaps.

However, the present invention enhances the degree to which turbulence and flow attenuation is developed, by superimposing variances in sectional flow areas upon the Tesla stratagem explained previously. In this invention, then, as illustrated in FIG. 3B, gaps between pairs of opposed surfaces [31–32], [33–34], [35–36], and [37–38] are substantially different. Especially, fluid emerging from a comparatively narrow gap such as [31–32] turbulently expands to fill a wider gap [33–34], thereafter being forced in to a comparatively narrow gap [35–36], and expanded again through gap [37–38].

As explained previously, changes in flow sectional area of as little as 5% are sufficient to effect substantially differing degrees of loss which vary on the order of nearly 10%, and in the preferred embodiment a 30% change in flow area reduces a fluid energy loss parameter to 49% of its original value.

Note also, that although the foregoing example provides in the preferred embodiment a strict alternation of narrow gaps followed by wide gaps, the present invention additionally includes other progressions of clearance variations within a plurality of interdigitated glands as well. For example, FIG. 3B provides gap [39–40] as an example of two adjacent narrow gaps included in the overall sequence of wide and narrow gaps.

Referring next to FIG. 4, a new method of adjustment of the seal members to overcome non-concentricity errors of manufacture can be explained. The rotor seal member [8] is fastened to the end disc [2] by a plurality of threaded fasteners. The preferred embodiment shown includes a radial array of countersunk mounting holes [42] in end disc [2], each of which receive countersunk head screws [43]. In this illustration, the receiving aperture which accepts rotor seal member [8] is shown with a non-concentricity error, or run-out error. The radial clearances [40, 41] between correctly manufactured features and the perimeter of rotor seal member [8] are seen to be unequal due to run-out with respect to the centerline of shaft [3].

By means of boring the countersunk mounting holes [42] sufficiently larger than screws [43] so as to accommodate radial positioning errors, rotor seal member [8] may be located and fixed in a position concentric with shaft [3] regardless of manufacturing run-out errors. Each screw [43] in each hole [43] will individually locate and bear against a portion of the countersunk surface, and in combination, the entire plurality of screws will rigidly fix rotor seal member [8] in any desired radial offset on the end disc [2].

The preferred assembly holds the gland features of rotor seal member [8] concentric with shaft [3]. It should further be understood that the adjustability afforded by this scheme includes the ability to negate run-out inherent in rotor seal member [8], in this case being the concentricity of the center of the hole pattern in [8] accepting of the screws [43] versus the center axis defined by the glands of rotor seal member [8].

Similarly, the housing seal member [9] is fastened to the end wall [1] by a plurality of threaded fasteners. The preferred embodiment shown includes a radial array of counterbored mounting holes [44] in end disc [2], each of which receive fasteners [45]. In this illustration, a receiving aperture in the housing end wall [1] accepts housing seal member [9].

Also similarly, by means of boring the mounting holes [42] sufficiently larger than fasteners [45] so as to accommodate radial positioning errors, housing seal member [9] may be located and fixed in a position concentric with shaft [3] regardless of manufacturing run-out errors. Each fastener [45] in each hole [44] will individually locate and bear against a portion of the counterbored surface, and in combination, the entire plurality of screws will rigidly fix rotor seal member [8] in any desired radial offset on the end disc [2]. The preferred assembly holds the gland features of housing seal member [9] concentric with shaft [3].

It should further be understood that the adjustability afforded by this scheme includes the ability to negate run-out inherent in housing seal member [9], in this case being the concentricity of the center of the hole pattern in [9] accepting of the fasteners [45] versus the center axis defined by the glands of housing seal member [9].

Also, it has been experimentally determined that compared to a pattern of countersunk holes, of which only three are required to restrain an annular member in position, for a pattern of counterbored holes, a larger number of holes is required; such as at least eight.

Continuing with FIG. 4, the functionality of inspection ports [14], [15], and [16] through housing seal member [9], end wall [1], can be fully explained. For the labyrinth seal to function as desired, it is most important that the glands of both members [8,9] are axially aligned so as to be concentric with the axis of rotation of the shaft assembly.

During assembly of the rotor, concentricity of rotor seal member [8] can be adjusted and assured. However, once encapsulated by assembly of the turbine housing, assessment and adjustment of precise concentric alignments of the seal glands becomes very difficult. This invention overcomes said difficulty by providing a plurality of substantially coaxial inspection ports, which run through stacked components to expose the glands themselves.

In the embodiment of FIG. 4, housing seal member [9] includes at least one inspection port [14], which is aligned with a similar port [15] in the rotor-housing. In the embodiment illustrated in Figure [2], the cover plate [7] also includes at least one port [16] as well. In the preferred embodiment, inspection ports [14], [15], and [16] in the case of a cover plate, all align to admit of visual inspection of the clearance and axial position of the seal gland members.

Returning to FIG. 2, the inspection ports [14,15,16] allow visual inspection of and measurement of the radial clearance between the exposed circumferential wall of one of the rotor seal glands [12] and one of the housing seal glands [13]. The inspection port [14] bored into the housing seal gland [9] extends into the sealing region and the operation of boring such a hole leaves a flat surface [17]. Comparative measurement of this surface and the depth of the floor of the passage cut in rotor seal member [8] affords a determination of the axial position of the entire rotor assembly with respect to the housing.

Selection of these two surfaces is preferred because of their proximity and because accuracy of this measurement is perturbed by only by the accuracy of placement of the gauging surface [17] with respect to any other datum defined by features comprising the housing seal member [9]. In practice, a measurement made from any housing datum surface to any rotor assembly surface exposed by the inspection port [14] is useful in determining relative axial distance between any internal housing datum feature and any axial surface of the rotor assembly. Thus many factors which would otherwise contribute to accumulated tolerance errors are eliminated by gauging access to these features afforded by the inspection port [14].

Additionally, a plurality of inspection ports [14, 15, 16] arranged in radial array provide a method of concentrically fixing the gland features pending firm and final assembly. The preferred method consists of inserting a first set of equally-sized gauging rods of a diameter equal to one-half the difference in diameters between the gland walls exposed by the inspection ports. So posited, these gauging rods force the gland members of seal members [8] and [9] into concentric alignment.

At this point a further assessment of concentricity may be made by replacing the set of gauging rods with a second set of a diameter smaller than the first set by the maximum acceptable run-out, then turning shaft [3] so as to rotate seal glands [12] and [13] with respect to each other. Any radial errors or run-out greater than the diameter difference of the first and second set of gauging rods will cause simultaneous contact of at least one rotor seal gland [12] and a housing seal gland [13] by at least one gauging rod.

Conversely, a full rotation resulting in no gauge rod becoming so simultaneously contacted represents assurance of concentricity and run-out to the degree of precision represented by the diameter difference of the first and second set of gauging rods.

Returning again to FIG. 4 with the foregoing method of accuracy assessment and adjustment understood, a further method of concentricity adjustment during assembly becomes apparent. With the rotor seal member [8] concentrically aligned with shaft [3], fasteners [45] resting in counterbores [44] are brought into light snugness. The assessment and alignment process described above is invoked, using substantially coaxial inspection ports [14] and [15]. Once the acceptable concentricity of seal gland features is attained and verified, fasteners [45] are tightened to final assembly torques.

Optionally, a fixative such as thread sealing compound, or a filler such as epoxy or babbit metal may be deposited in at least one countersink well or counterbores, so as to firmly lock the fastener in place and also provide evidence of attempted tampering of the individual fastener or of the fixed alignment as a whole.

Moving on to FIG. 5, the advantages of an additional embodiment of this invention may be explained and understood. This embodiment resembles that of FIG. 4, but with an additional component attached to the outside of the housing [1]. In this embodiment, as shown in FIGS. [1] and [2], this component is a cover plate [7] which includes support for shaft bearings and shaft seals. However, it is not a necessary item of this invention that the cover plate [7] provide those functions.

In FIG. 5, the cover plate [7] includes a inspection port [16] substantially coaxial with inspection ports [14] and [15] as described above to preserve the functions and methods described above. Fasteners commonly include tool-receiving features such as slots, crossed slots, and various polygonal recesses for receiving torque applied by an installation tool such as a screw driver or a hex wrench. Operation of the fasteners [45] is by way of an access hole [50] provided in cover plate [7]. In this embodiment, said hole [50] is smaller than the head dimension of the fastener [45], thereby trapping the fastener [45] within the assembly stack, while still permitting adjustment. Additional permanence may be secured by means of pouring babbit metal or a similar alloy to fill the screw recess [44] and the hole [50].

Proceeding to FIG. 6A, a prior art rotor [2] is illustrated, wherein rotor seal glands [43] are features integral to said rotor [2]. The outside dimensions of cylindrical stock from which said rotor [2] of the prior art must be turned is shown by the phantom line box [47] in FIG. 6A.

In this invention however, as shown in FIG. 6B, rotor seal glands [12] are features of a discrete component [8], the rotor seal member. This rotor seal member [8] resides in a recess provided in rotor [2]. The outside dimensions of cylindrical stock from which a rotor [2] of this invention must be turned is shown by the phantom line box [48] in FIG. 6B.

Clearly it is seen that both the volume of stock material required to be secured in order to make a rotor [2] of this invention, as well as the volume of material removed from this stock, are reduced by this invention. Thus secured are reductions in material requirements, machining time, material waste, component complexity, and cost.

Lastly, returning to FIG. 2, the inspection ports [14], [15], and [16] are typically plugged with a fastener or sealant, to prevent the escape of working fluid. However, it is useful to provide at least one substantially coaxial inspection port set with hose, tube, or pipe fittings, so that connection may be made to metering or sampling equipment such as a pressure gauge or an oxygen sensor, wherein an aliquot of working fluid passes through this port to such a sensing device.

Similarly, a sensor whose body design provides a sealing fit, such as a thermocouple, may be installed into complimentary receiving affordances machined into inspection ports [14], [15], and [16]. Specific examples of such affordances include screw or pipe threads into which a threaded sensor body sealingly inserts.

Although the description above contains many specificities, these should not be construed as limiting the scope of the invention, but as merely illustrative of the most preferred embodiments. For one example, although it is understood first, that changes of flow sectional area of at least 5% are sufficient to produce sizable frictional losses of nearly 10%, and second, that a preferred sequence of flow sectional area changes is one in which reduced areas alternate with enlarged areas, a functional variant comprising a series of diminishing areas, and another functional variant comprising a series of expanding areas, reside within the scope of this invention.

For another example, a cover plate may or may not include any or all features such as bearing support flanges, affordances for shaft seals, or working fluid exhaust ports. Also, the counterbored accepting recess [44] shown in FIG. 5 to be a feature of turbine housing [1] may instead be an interior feature of cover plate [7], allowing the fasteners [45] to bear upon the outer surface of the housing [1]. The locations of standard hardware such as countersunk screws and cap screws as mentioned in this invention may be exchanged, and other fasteners may be employed to the described purposes as well.

Furthermore, while the location of the inspection ports is shown at or near the most distal gland member of the labyrinth seal, the affordances and methods described also apply for ports located to expose any gland members, even those closer to the shaft.

Lastly, while the forgoing elucidates the action of a single labyrinth seal operating between fluid at an inlet condition and an outlet condition, the scope of this invention includes any number of concentric sets of labyrinth seal members operating between the fluid at an inlet condition and an outlet condition, as well seals offering flow impedance and sampling access to working fluid at intermediate conditions existing between the outlet of any one labyrinth seal and the inlet of any subsequent labyrinth seal downstream of the previous seal outlet as defined by the direction of fluid flow through the sets of seals.

Thus the scope of the invention should be determined by the appended claims and their legal equivalents, rather than by the examples given.

What is claimed is:

1. A disc turbine comprising:
    a housing defining an interior space and having and end wall;
    a rotatable shaft passing through said housing and having an axis of rotation;
    a plurality of rotor discs mounted to said shaft for concentric rotation including at least one end disc having an outside face, said end wall and said outside face being adjacent, substantially parallel surfaces;
    a first seal member comprising an annulus affixed to said end wall, said first seal member having a plurality of cylindrical glands, each gland axially projecting toward said end disc from a root to an end face, said root being defined between radially spaced concentric re-entrant corners and said end face comprising at least one sharp edge;
    and a second seal member comprising an annulus affixed to said end disc, said second seal member having a second plurality of cylindrical glands, each gland axially projecting toward said end wall from a root to an end face, said root being defined between radially spaced concentric re-entrant corners and said end face comprising at least one sharp edge;
    wherein said first plurality and second plurality of glands interdigitate and said re-entrant corners are complimentary to said at least one sharp edge, to define a convoluted gap which in the radial direction comprises a plurality of axial portions each having an axial dimension and at least one of said axial portions having a radial dimension which differs from the axial dimension of an adjacent radial portion by at least 5%.

2. A disc turbine as in claim 1, wherein said at least one re-entrant corner defines an angle of approximately 90 degrees.

3. A disc turbine as in claim 1, wherein said at least one sharp edge defines an angle of approximately 90 degrees.

4. A disc turbine as in claim 1, wherein said first seal member has a conical taper feature, and the housing end wall has a complimentary annular recess for receiving said conical taper feature.

5. A disc turbine as in claim 1, wherein said second seal member has a conical taper feature, and an end disc has a complimentary annular recess for receiving said conical taper feature.

6. A disc turbine as in claim 1, having a convoluted gap having a first axial portion having a first radial dimension adjacent to a radial portion having an axial dimension adjacent to a second axial portion having a second radial dimension, wherein said axial dimension of said radial portion is 30% smaller than said first radial dimension and said second radial dimension is at least 5% larger than said first radial dimension.

7. A disc turbine as in claim 1, having a seal member having a first array of mounting holes, and a housing having a second array of countersunk mounting holes substantially congruent to said first hole array.

8. A disc turbine comprising:
    a housing defining an interior space and having an end wall pierced by at least one first inspection port;
    a rotatable shaft passing through said housing and having an axis of rotation;
    a plurality of rotor discs mounted to said shaft for concentric rotation including at least one end disc having an outside face, said end wall and said outside face being adjacent, substantially parallel surfaces;
    a first seal member comprising an annulus affixed to said end wall, said first seal member having a plurality of cylindrical glands, each gland axially projecting toward said end disc from a root to an end face, and at least one second inspection port aligned with a housing inspection port; and
    a second seal member comprising an annulus affixed to said end disc, said second seal member having a plurality of cylindrical glands, each gland axially projecting toward said end wall;
    wherein said cylindrical glands of said second seal member are exposed to view and contact from without the housing through said first and second inspection ports.

9. A disc turbine as in claim 8, wherein said inspection port of said first seal member exposes the cylindrical glands of said first seal member to view from outside of said housing.

10. A disc turbine as in claim 8, having sensing means for sampling said working fluid through said first inspection port.

11. A disc turbine as in claim 8, wherein an inspection port receives a measuring device selected from the group of measuring devices consisting of: a thermocouple, a pressure sensor, an oxygen sensor, a temperature sensor, a pitot tube, a flow meter, a heated wire, a strain gauge, a piezoelectric crystal, an optical fiber and a cantilevered member.

12. A disc turbine as in claim 8, having a seal member having a first array of mounting holes, and a housing having a second array of countersunk mounting holes substantially congruent to said first hole array.

13. A disc turbine comprising:
    a housing defining an interior space and having an end wall and a first plurality of through holes;
    a rotatable shaft passing through said housing and having an axis of rotation;
    a plurality of rotor discs mounted to said shaft for concentric rotation including at least one end disc having an outside face;
    a housing seal member having a second plurality of through holes substantially congruent to said housing first plurality of holes;
    fastening hardware with a head dimension and a tool receiving feature, residing in said second plurality of seal member holes; and
    a cover plate having a third plurality of through holes substantially coaxially congruent to said first and second through hole pluralities;
    wherein said tool receiving feature is exposed by said third plurality of holes and the head dimension of the fastener interferes with said third plurality of holes.

* * * * *